(12) United States Patent
Chu et al.

(10) Patent No.: US 12,355,934 B2
(45) Date of Patent: Jul. 8, 2025

(54) MULTI-VIEWPOINT IMAGE PROCESSING SYSTEM AND METHOD THEREOF

(71) Applicant: BOE Technology Group Co., Ltd., Beijing (CN)

(72) Inventors: Minglei Chu, Beijing (CN); Xin Duan, Beijing (CN); Shuo Zhang, Beijing (CN); Yan Sun, Beijing (CN); Tiankuo Shi, Beijing (CN); Wei Sun, Beijing (CN); Kuanjun Peng, Beijing (CN); Xue Dong, Beijing (CN); Jiantao Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/765,454

(22) PCT Filed: May 28, 2021

(86) PCT No.: PCT/CN2021/096720
§ 371 (c)(1),
(2) Date: Mar. 31, 2022

(87) PCT Pub. No.: WO2022/246791
PCT Pub. Date: Dec. 1, 2022

(65) Prior Publication Data
US 2024/0114118 A1    Apr. 4, 2024

(51) Int. Cl.
*H04N 13/161* (2018.01)
*H04N 13/15* (2018.01)
(Continued)

(52) U.S. Cl.
CPC ........... *H04N 13/161* (2018.05); *H04N 13/15* (2018.05); *H04N 13/194* (2018.05); *H04N 13/282* (2018.05); *H04N 13/302* (2018.05)

(58) Field of Classification Search
CPC .... H04N 13/161; H04N 13/15; H04N 13/302; H04N 13/194; H04N 13/282; H04N 13/243; H04N 19/597
(Continued)

(56) References Cited

U.S. PATENT DOCUMENTS

| | | | |
|---|---|---|---|
| 2011/0128355 A1* | 6/2011 | Suzuki ................. | H04N 13/178 348/E13.074 |
| 2013/0135365 A1* | 5/2013 | Ito .......................... | G09G 3/003 345/690 |
| 2021/0183014 A1* | 6/2021 | Fang .................... | G06V 10/764 |

* cited by examiner

*Primary Examiner* — Jamie J Atala
*Assistant Examiner* — Mahmoud Kamal Abouzahra
(74) *Attorney, Agent, or Firm* — Ling Wu; Stephen Yang; Ling and Yang Intellectual Property

(57) ABSTRACT

A multi-viewpoint image processing system includes a processing apparatus and a display apparatus, the processing apparatus includes an acquisition module and an encoding module, wherein the acquisition module is configured to acquire K viewpoint images, and a viewpoint image includes M rows and N columns of pixels; the encoding module is configured to receive the K viewpoint images, encode the K viewpoint images to generate a plurality of encoded images, and send the plurality of encoded images to the display apparatus; the display apparatus is configured to receive the plurality of encoded images and obtain M pieces of display information according to the plurality of encoded images, an i-th piece of display information including i-th rows of pixels of the K viewpoint images, i=1, 2, . . . , M; and perform stereoscopic display according to the M pieces of display information.

13 Claims, 5 Drawing Sheets

10

20

(51) Int. Cl.
*H04N 13/194* (2018.01)
*H04N 13/282* (2018.01)
*H04N 13/302* (2018.01)

(58) Field of Classification Search
USPC .......................................................... 348/43
See application file for complete search history.

MULTI-VIEWPOINT IMAGE PROCESSING SYSTEM AND METHOD THEREOF

CROSS-REFERENCE TO RELATED APPLICATION

The present application is a U.S. National Phase Entry of International Application No. PCT/CN2021/096720 having an international filing date of May 28, 2021, the entire content of which is hereby incorporated by reference.

TECHNICAL FIELD

Embodiments of the present disclosure relate to, but are not limited to, the field of image processing technologies, and more particularly, relate to a multi-viewpoint image processing system and a method thereof.

BACKGROUND

Stereoscopic imaging, which is one of the hottest technologies in the video and image industry, promotes technological changes from flat display to stereoscopic display. A stereoscopic display technology is a key part of the stereoscopic image industry and is mainly divided into two categories, namely, an eye stereoscopic display technology and a naked-eye stereoscopic display technology. The naked-eye stereoscopic display technology is a technology that enables viewers to view stereoscopic display pictures without wearing glasses. Compared with eye stereoscopic display, naked-eye stereoscopic display belongs to an auto-stereoscopic display technology, which reduces constraints on the viewers.

Generally, the naked-eye stereoscopic display is based on multiple viewpoints, and sequences of parallax images (frames) are formed at different positions in a space, so that pairs of stereoscopic images having a parallax relationship may enter left and right eyes of a person respectively, thereby bringing stereoscopic perception to the viewers. Stereoscopic display is usually implemented through a multi-viewpoint naked-eye stereoscopic display.

SUMMARY

The following is a summary about the subject matter described herein in detail. The summary is not intended to limit the protection scope of claims.

In a first aspect, the present disclosure provides a multi-viewpoint image processing system including a processing apparatus and a display apparatus, wherein the processing apparatus includes an acquisition module and an encoding module, the acquisition module is configured to acquire K viewpoint images, wherein a viewpoint image includes M rows and N columns of pixels, K is a positive integer greater than or equal to 2, and M and N are positive integers greater than or equal to 1; the encoding module is configured to receive the K viewpoint images, encode the K viewpoint images to generate a plurality of encoded images, and send the plurality of encoded images to the display apparatus; the display apparatus is configured to receive the plurality of encoded images and obtain M pieces of display information according to the plurality of encoded images, an i-th piece of display information including i-th rows of pixels of the K viewpoint images, i=1, 2, . . . , M; and perform stereoscopic display according to the M pieces of display information; and the processing apparatus is arranged in the display apparatus, or the processing apparatus and the display apparatus are arranged separately.

In one possible implementation, the acquisition module is configured to acquire an image to be displayed, and acquire the K viewpoint images according to the image to be displayed.

In one possible implementation, the multi-viewpoint image processing system further includes a multi-viewpoint collection apparatus which includes a plurality of Charge Coupled Device (CCD) cameras, wherein each of the CCD cameras in the multi-viewpoint collection apparatus performs dynamic scene collection to obtain the K viewpoint images; and the acquisition module is configured to receive the K viewpoint images obtained by the multi-viewpoint collection apparatus.

In one possible implementation, the encoding module is configured to select an m-th viewpoint image from the K viewpoint images as a first viewpoint image, and take all viewpoint images except the m-th viewpoint image as second viewpoint images, a quantity of the second viewpoint images being K−1, 1≤m≤K; obtain K−1 first images according to the first viewpoint image and the K−1 second viewpoint images, wherein a k-th first image is obtained according to the first viewpoint image and a k-th second viewpoint image, k=1, 2, . . . , K−1; obtain K−1 encoded images according to the first viewpoint image, the K−1 second viewpoint images, and the K−1 first images, wherein a k-th encoded image is obtained according to the first viewpoint image, the k-th second viewpoint image, and the k-th first image; and send the K−1 encoded images and the first viewpoint image, the first images and the encoded images each including M rows and N columns of pixels.

In one possible implementation, the encoding module is further configured to obtain information of a pixel in an i-th row and a j-th column of the k-th first image according to information of a pixel in an i-th row and a j-th column of the first viewpoint image and information of a pixel in an i-th row and a j-th column of the k-th second viewpoint image; and obtain the k-th first image according to information of all pixels of the k-th first image, j=1, 2, . . . , N.

In one possible implementation, the information of the pixel includes color component information, the color component information includes a first color component value, a second color component value, and a third color component value, and the first color, the second color, and the third color are one of red, green, and blue respectively and are different colors; the encoding module is further configured to obtain a grayscale value of the pixel in the i-th row and the j-th column of the first viewpoint image according to color component information of the pixel in the i-th row and the j-th column of the first viewpoint image; and obtain a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel; or the encoding module is further configured to calculate a difference between a first color component value of the pixel in the i-th row and the j-th column of the first viewpoint image and a first color component value of the pixel in the i-th row and the j-th column of the k-th second viewpoint image to obtain a first color component difference; calculate a difference between a second color component value of the pixel in the i-th row and the j-th column of the first viewpoint image and a second color component value of the pixel in the i-th row and the j-th column of the k-th second viewpoint image to obtain a second color component difference; calculate a difference between a third color component value of the pixel in the i-th row and the j-th column of the first viewpoint image and a third color component value of the pixel in the i-th row and the j-th column of the k-th second viewpoint image to obtain a third color component difference; and obtain a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel; and when a color of the pixel in the i-th row and the j-th column of the k-th second viewpoint image is different, a threshold difference during obtaining the k-th first image is different.

In one possible implementation, the encoding module is further configured to take a first row of pixels of the first viewpoint image as a first row of pixels of each of the encoded images; scan a first row of pixels of the k-th first image; when there is no white pixel in the first row of pixels of the k-th first image, select a next row of pixels of the first viewpoint image as a next row of pixels of the k-th encoded image; and when there is a white pixel in the first row of pixels of the k-th first image, obtain position information of the white pixel and information of a pixel corresponding to the white pixel in the k-th second viewpoint image, store the position information of the white pixel and the information of the pixel corresponding to the white pixel in the k-th second viewpoint image into two adjacent pixels in the next row of pixels of the k-th encoded image, and scan sequentially an r-th row of pixels of the k-th first image until scanning of a last row of pixels of the k-th first image is completed, to obtain the k-th encoded image, 2≤r≤M, wherein position information includes a row and a column where a white pixel is located in a first image, and a pixel corresponding to the white pixel in a second viewpoint image is a pixel in the second viewpoint image, which is located in the row and the column where the white pixel is located in the first image.

In one possible implementation, the display apparatus includes a decoding module and a display module, wherein the decoding module is configured to receive the plurality of encoded images and obtain the M pieces of display information according to the plurality of encoded images; and the display module is configured to receive the M pieces of display information and perform stereoscopic display according to the M pieces of display information.

In one possible implementation, the decoding module is further configured to obtain K−1 second viewpoint images according to K−1 encoded images, wherein the k-th second viewpoint image is obtained according to a k-th encoded image; and obtain the M pieces of display information according to a first viewpoint image and the K−1 second viewpoint images.

In one possible implementation, the decoding module is further configured to take a first row of pixels of the k-th encoded image as a first row of pixels of the k-th second viewpoint image, scan a next row of pixels of the k-th encoded image, if position information is included in the next row of pixels, acquire information of a pixel stored in a pixel adjacent to a pixel including the position information, and update information of a pixel located at the position information in the k-th second viewpoint image to the information of the pixel stored in the pixel adjacent to the pixel including the position information; and if no position information is included in the next row of pixels, take the next row of pixels of the k-th encoded image as a next row of pixels of the k-th second viewpoint image, and scan sequentially an r-th row of pixels of the k-th encoded image until scanning of a last row of pixels of the k-th encoded image is completed, to obtain the k-th second viewpoint image.

In one possible implementation, the decoding module is configured to obtain the i-th rows of pixels of the K viewpoint images according to the first viewpoint image and the K−1 second viewpoint images, i=1, 2, . . . , M; and obtain the M pieces of display information according to first rows of pixels to M-th rows of pixels of the K viewpoint images; and the display module is configured to display the i-th rows of the K viewpoint images according to the i-th piece of display information.

In one possible implementation, the encoding module is configured to extract sequentially an i-th row of pixels of each of the viewpoint images to form M second images, each of the second images including K rows and N columns of pixels, and an n-th row of pixels of an i-th second image being an i-th row of pixels of an n-th viewpoint image, n=1, 2, . . . , K; and encode the M second images to generate M encoded images.

In one possible implementation, the display apparatus is configured to decode sequentially the M encoded images to obtain the M second images, the i-th second image including the i-th piece of display information; and display the i-th rows of the K viewpoint images according to the i-th second image.

In a second aspect, the present disclosure further provides an image processing method, which includes: acquiring K viewpoint images, wherein a viewpoint image includes M rows and N columns of pixels, K is a positive integer greater than or equal to 2, and M and N are positive integers greater than or equal to 1; receiving the K viewpoint images, encode the K viewpoint images to generate a plurality of encoded images, and send the plurality of encoded images to a display apparatus; receiving the plurality of encoded images and obtain M pieces of display information according to the plurality of encoded images, an i-th piece of display information including the i-th rows of pixels of the K viewpoint images, i=1, 2, . . . , M; and performing stereoscopic display according to the M pieces of display information.

In one possible implementation, the acquiring the K viewpoint images includes: acquiring an image to be displayed, and acquiring the K viewpoint images according to the image to be displayed, or acquiring the K viewpoint images obtained by a multi-viewpoint collection apparatus.

In one possible implementation, the encoding the K viewpoint images to generate the plurality of encoded images includes: selecting an m-th viewpoint image from the K viewpoint images as a first viewpoint image, and taking all viewpoint images except the m-th viewpoint image as second viewpoint images, a quantity of the second viewpoint images being K−1, 1≤m≤K; obtaining K−1 first images according to the first viewpoint image and the K−1 second viewpoint images, wherein a k-th first image is obtained according to the first viewpoint image and a k-th second viewpoint image, k=1, 2, . . . , K−1; obtaining K−1 encoded images according to the first viewpoint image, the K−1 second viewpoint images, and the K−1 first images, wherein a k-th encoded image is obtained according to the first viewpoint image, the k-th second viewpoint image, and the k-th first image; and sending the K−1 encoded images and the first viewpoint image, the first images and the encoded images each including M rows and N columns of pixels.

In one possible implementation, the obtaining the K−1 first images according to the first viewpoint image and the K−1 second viewpoint images includes: obtaining information of a pixel in an i-th row and a j-th column of the k-th first image according to information of a pixel in an i-th row and a j-th column of the first viewpoint image and information of a pixel in an i-th row and a j-th column of the k-th second viewpoint image; and obtaining the k-th first image according to information of all pixels of the k-th first image, j=1, 2, . . . , N; the information of the pixel includes color component information, the color component information includes a first color component value, a second color component value, and a third color component value, and the first color, the second color, and the third color are one of red, green, and blue respectively and are different colors; the obtaining the information of the pixel in the i-th row and the j-th column of the k-th first image according to the information of the pixel in the i-th row and the j-th column of the first viewpoint image and the information of the pixel in the i-th row and the j-th column of the k-th second viewpoint image includes: obtaining a grayscale value of the pixel in the i-th row and the j-th column of the first viewpoint image according to color component information of the pixel in the i-th row and the j-th column of the first viewpoint image; and obtaining a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel; or calculating a difference between a first color component value of the pixel in the i-th row and the j-th column of the first viewpoint image and a first color component value of the pixel in the i-th row and the j-th column of the k-th second viewpoint image to obtain a first color component difference; calculating a difference between a second color component value of the pixel in the i-th row and the j-th column of the first viewpoint image and a second color component value of the pixel in the i-th row and the j-th column of the k-th second viewpoint image to obtain a second color component difference; calculating a difference between a third color component value of the pixel in the i-th row and the j-th column of the first viewpoint image and a third color component value of the pixel in the i-th row and the j-th column of the k-th second viewpoint image to obtain a third color component difference; and obtaining a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel; when a color of the pixel in the i-th row and the j-th column of the k-th second viewpoint image is different, a threshold difference during obtaining the k-th first image is different; and the obtaining the K−1 encoded images according to the first viewpoint image, the K−1 second viewpoint images, and the K−1 first images includes: taking a first row of pixels of the first viewpoint image as a first row of pixels of each of the encoded images; scanning a first row of pixels of the k-th first image; when there is no white pixel in the first row of pixels of the k-th first image, selecting a next row of pixels of the first viewpoint image as a next row of pixels of the k-th encoded image; and when there is a white pixel in the first row of pixels of the k-th first image, obtaining position information of the white pixel and information of a pixel corresponding to the white pixel in the k-th second viewpoint image, storing the position information of the white pixel and the information of the pixel corresponding to the white pixel in the k-th second viewpoint image into two adjacent pixels in the next row of pixels of the k-th encoded image, and scanning sequentially an r-th row of pixels of the k-th first image until scanning of a last row of pixels of the k-th first image is completed, to obtain the k-th encoded image, 2≤r≤M, wherein position information includes a row and a column where a white pixel is located in a first image, and a pixel corresponding to the white pixel in a second viewpoint image is a pixel in the second viewpoint image, which is located in the row and the column where the white pixel is located in the first image.

In one possible implementation, the obtaining the M pieces of display information according to the plurality of encoded images includes: obtaining K−1 second viewpoint images according to K−1 encoded images, wherein a k-th second viewpoint image is obtained according to a k-th encoded image; and obtaining the M pieces of display information according to a first viewpoint image and the K−1 second viewpoint images; the obtaining the K−1 second viewpoint images according to the K−1 encoded images includes: taking a first row of pixels of the k-th encoded image as a first row of pixels of the k-th second viewpoint image, scanning a next row of pixels of the k-th encoded image, if position information is included in the next row of pixels, acquiring information of a pixel stored in a pixel adjacent to a pixel including the position information, and updating information of a pixel located at the position information in the k-th second viewpoint image to the information of the pixel stored in the pixel adjacent to the pixel including the position information; and if no position information is included in the next row of pixels, taking the next row of pixels of the k-th encoded image as a next row of pixels of the k-th second viewpoint image, and scanning sequentially an r-th row of pixels of the k-th encoded image until scanning of a last row of pixels of the k-th encoded image is completed, to obtain the k-th second viewpoint image; the obtaining the M pieces of display information of the K viewpoint images according to the first viewpoint image and the K−1 second viewpoint images includes: obtaining sequentially the i-th rows of pixels of the K viewpoint images; and obtaining the M pieces of display information according to first rows of pixels to M-th rows of pixels of the K viewpoint images; the performing stereoscopic display according to the M pieces of display information includes: displaying the i-th rows of pixels of the K viewpoint images according to the i-th piece of display information.

In one possible implementation, the encoding the K viewpoint images to generate the plurality of encoded images includes: extracting sequentially an i-th row of pixels of each of the viewpoint images to form M second images, each of the second images including K rows and N columns of pixels, and an n-th row of pixels of an i-th second image being an i-th row of pixels of an n-th viewpoint image, n=1, 2, . . . , K; and encoding the M second images to generate M encoded images.

In one possible implementation, the obtaining the M pieces of display information of the K viewpoint images according to the plurality of encoded images includes: decoding sequentially M encoded images to obtain M second images, an i-th second image including the i-th piece of display information; and displaying the i-th rows of the K viewpoint images according to the i-th second image.

After the drawings and the detailed description are read and understood, other aspects may become apparent.

BRIEF DESCRIPTION OF DRAWINGS

The drawings are intended to provide an understanding of technical solutions of the present disclosure and constitute a part of the specification, and are used for explaining the technical solutions of the present disclosure together with embodiments of the present disclosure, and not intended to constitute limitations to the technical solutions of the present disclosure.

DETAILED DESCRIPTION

Multiple embodiments are described in the present disclosure, but the description is exemplary rather than restrictive. For those of ordinary skill in the art, there may be more embodiments and implementations within the scope contained by the embodiments described in the present disclosure. Although many possible combinations of features are shown in the accompanying drawings and discussed in specific implementations, many other combinations of the disclosed features are also possible. Unless specifically limited, any feature or element of any embodiment may be used in combination with any other feature or element in any other embodiment, or may substitute any other feature or element in any other embodiment.

Combinations of features and elements known to those of ordinary skill in the art are included and conceived in the present disclosure. The embodiments, features, and elements that have been disclosed in the present disclosure may also be combined with any of conventional features or elements to form technical solutions defined by the claims. Any feature or element of any embodiment may also be combined with features or elements from other technical solutions to form another technical solution defined by the claims. Therefore, it should be understood that any of the features shown and discussed in the present disclosure may be implemented separately or in any suitable combination. Therefore, the embodiments are not subject to other limitations except limitations made according to the appended claims and equivalent substitutions thereof. Furthermore, various modifications and alterations may be made within the protection scope of the appended claims.

Unless otherwise defined, technical terms or scientific terms used in the present disclosure shall have ordinary meanings understood by those of ordinary skills in the art to which the present disclosure belongs. "First", "second", and the like used in the present disclosure do not indicate any order, quantity, or importance, but are intended to distinguish different components only. "Include" or "contain" or the like means that an element or article appearing before this word contains elements or articles listed after this word and their equivalents, and does not exclude other elements or articles. "Connected" or "coupled" or the like are not limited to a physical or mechanical connection, but may include an electrical connection, whether direct or indirect. "Upper", "lower", "left", "right", etc., only indicate relative position relationships, which may be changed accordingly when an absolute position of a described object is changed.

For an ultra-high-resolution multi-viewpoint naked-eye stereoscopic display, there is no effective data transmission method which enables stereoscopic display of an ultra-high-resolution image by a multi-viewpoint naked-eye stereoscopic display.

Figure 1:
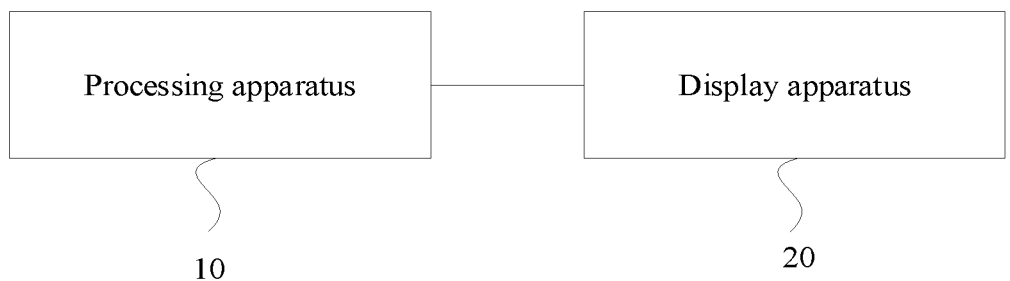
FIG. 1 is a schematic diagram of a structure of a multi-viewpoint image processing system according to an embodiment of the present disclosure.
Figure 2:
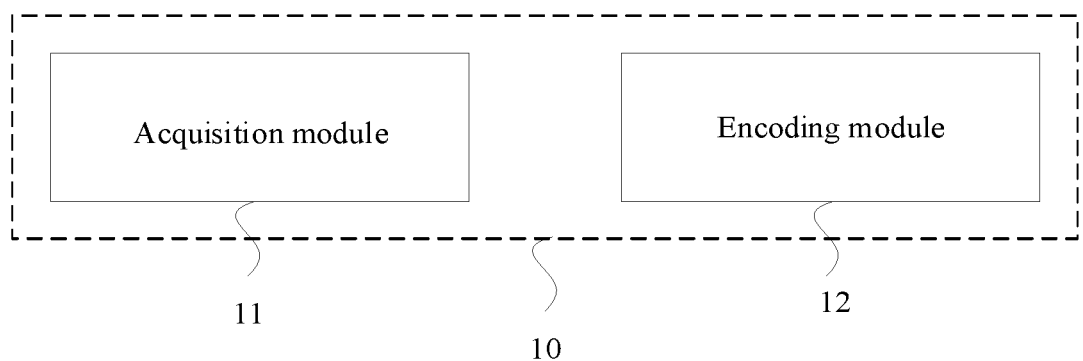
FIG. 2 is a schematic diagram of a structure of a processing apparatus according to an embodiment of the present disclosure.

FIG. 1 is a schematic diagram of a structure of a multi-viewpoint image processing system according to an embodiment of the present disclosure, and FIG. 2 is a schematic diagram of a structure of a processing apparatus according to an embodiment of the present disclosure. As shown in FIGS. 1 and 2, the multi-viewpoint image processing system according to the embodiment of the present disclosure includes a processing apparatus 10 and a display apparatus 20 connected with the processing apparatus 10. The processing apparatus 10 includes an acquisition module 11 and an encoding module 12. The acquisition module 11 is configured to acquire K viewpoint images. The encoding module 12 is configured to receive the K viewpoint images, encode the K viewpoint images, generate a plurality of encoded images, and send the plurality of encoded images to the display apparatus 20. The display apparatus 20 is configured to receive the plurality of encoded images and obtain M pieces of display information according to the plurality of encoded images, an i-th piece of display information including i-th rows of pixels of the K viewpoint images; and perform stereoscopic display according to the M pieces of display information.

In an exemplary embodiment, a viewpoint image may include M rows and N columns of pixels. Both M and N are positive integers greater than 1, and values of M and N depend on contents of stereoscopic display, which is not limited in the present disclosure.

In an exemplary embodiment, K may be a positive integer greater than or equal to 2, for example, K may be 28 or 45. A value of K may be determined according to a demand for stereoscopic display. The higher the demand for stereoscopic display is, the larger the value of K is.

In an exemplary embodiment, i=1, 2, ..., M. A first piece of display information includes first rows of pixels of the K viewpoint images, a second piece of display information includes second rows of pixels of the K viewpoint images, an m-th piece of display information includes m-th rows of pixels of the K viewpoint images, and so on.

In an exemplary embodiment, the processing apparatus may be a server, a personal computer, or a processor that performs logical operations, such as a device having a data processing capability and a program execution capability, such as a Central Processing Unit (CPU), a Field Programmable Gate Array (FPGA), a Digital Signal Processor (DSP), a Microcontroller Unit (MCU), and an Application Specific Integrated Circuit (ASIC).

In an exemplary embodiment, the display apparatus may be composed of a display unit and a grating unit. The display unit may be a liquid crystal display panel, an organic light emitting diode display panel, or a plasma display panel. The grating unit may be a slit grating or a lenticular grating, which is not limited in the present disclosure. The display apparatus forms stereoscopic display by displaying two or more than two viewpoint images. Different display apparatuses have different resolutions, numbers of viewpoints, and arrangements of viewpoints, so formats of a plurality of viewpoint images are determined by the display apparatuses.

In an exemplary embodiment, when the processing apparatus is a processor, the processing apparatus may be arranged in the display apparatus.

In an exemplary embodiment, the processing apparatus and the display apparatus may be arranged separately. As shown in FIG. 1, FIG. 1 is illustrated by taking the processing apparatus and the display apparatus being arranged separately as an example.

In an exemplary embodiment, connecting includes connecting through a wireless network, a wired network, or any combination of wireless and wired networks. A network may include a local area network, the Internet, a telecommunication network, an Internet of Things based on the Internet and a telecommunication network, or any combination of the above networks. The wired network may use wire, twisted pair, coaxial cable, or optical fiber transmission for information transmission, and the wireless networks may use a communication method such as a Wireless Wide Area Network (WWAN) mobile communication network, Bluetooth, Zigbee, or Wireless Fidelity (WiFi), for example.

The multi-viewpoint image processing system according to the embodiment of the present disclosure includes the processing apparatus and the display apparatus, the processing apparatus includes the acquisition module and the encoding module, wherein the acquisition module is configured to acquire the K viewpoint images, wherein a viewpoint image includes M rows and N columns of pixels, K is a positive integer greater than or equal to 2, and M and N are positive integers greater than or equal to 1; the encoding module is configured to receive the K viewpoint images, encode the K viewpoint images, generate the plurality of encoded images, and send the plurality of encoded images to the display apparatus; and the display apparatus is configured to receive the plurality of encoded images and obtain the M pieces of display information according to the plurality of encoded images, the i-th piece of display information including the i-th rows of pixels of the K viewpoint images; and perform stereoscopic display according to the M pieces of display information. The multi-viewpoint image processing system according to the embodiment of the present disclosure solves effectively data transmission and display of a multi-viewpoint naked-eye stereoscopic screen, is simple and easy to implement, and may achieve intellectualization quickly.

In an exemplary embodiment, the processing apparatus may include a first interface and the display apparatus may include a second interface. The encoded images may be transmitted to the second interface through the first interface.

In an exemplary embodiment, the display apparatus may perform image rendering on images to be displayed, to obtain the K viewpoint images.

In an exemplary embodiment, the acquisition module may be configured to acquire an image to be displayed, and acquire K viewpoint images according to the image to be displayed.

In an exemplary embodiment, the image to be displayed may be a two-dimensional image.

In an exemplary embodiment, the multi-viewpoint image processing system may further include a multi-viewpoint collection apparatus which includes a plurality of Charge Coupled Device (CCD) cameras, wherein each of the CCD cameras in the multi-viewpoint collection apparatus performs dynamic scene collection to obtain the K viewpoint images.

In an exemplary embodiment, the acquisition module is configured to receive the K viewpoint images obtained by the multi-viewpoint collection apparatus.

In an exemplary embodiment, system calibration is performed on each of the CCD cameras in the multi-viewpoint collection apparatus before the each of the CCD cameras performs the dynamic scene collection.

In an exemplary embodiment, the multi-viewpoint collection apparatus may include a multi-camera collection array and a light field environment. The multi-camera collection array collects information as much as possible from different angles in a ring placement manner. A CCD camera for collection is required to be able to achieve 30 frames per second and 10 million pixels for collection, and an image resolution to reach more than 1920×1080, which meets requirements for high-quality dynamic capture of information. The light field environment is composed of Light Emitting Diodes (LEDs) distributed in a ring evenly, and its main function is to provide illumination to facilitate collection of information by the CCD camera. A view collection apparatus based on multiple CCD cameras distributed circumferentially is more suitable for real-time collection of data. One circle of CCD cameras is installed on a circumference of a height of the view collection apparatus, and each CCD camera captures a view in its own viewing angle direction. Since all of CCD cameras collect images at the same time and shooting time of one circle of views is very short, it is conductive to collection of viewpoint images.

In an exemplary embodiment, the encoding module may be configured to select an m-th viewpoint image from the K viewpoint images as a first viewpoint image, and take all viewpoint images except the m-th viewpoint image as second viewpoint images, a quantity of the second viewpoint images being K−1, 1≤m≤K; obtain K−1 first images according to the first viewpoint image and the K−1 second viewpoint images, wherein a k-th first image is obtained according to the first viewpoint image and a k-th second viewpoint image, k=1, 2, ..., K−1; and obtain K−1 encoded images according to the first viewpoint image, the K−1 second viewpoint images, and the K−1 first images, wherein a k-th encoded image is obtained according to the first viewpoint image, the k-th second viewpoint image, and the k-th first image.

In an exemplary embodiment, m is any value from 1 to K, and m may be 1 or other numbers.

In an exemplary embodiment, a first image includes M rows and N columns of pixels.

In an exemplary embodiment, an encoded image includes M rows and N columns of pixels.

In an exemplary embodiment, a middle viewpoint image is selected as a first viewpoint image, and all viewpoint images except the middle viewpoint image are taken as second viewpoint images. Selecting the middle viewpoint image as the first viewpoint image may reduce computational complexity of an image processing.

In an exemplary embodiment, a bit depth of each pixel may be 24.

In an exemplary embodiment, the encoding module is configured to transmit the K−1 encoded images and the first viewpoint image.

Figure 3:
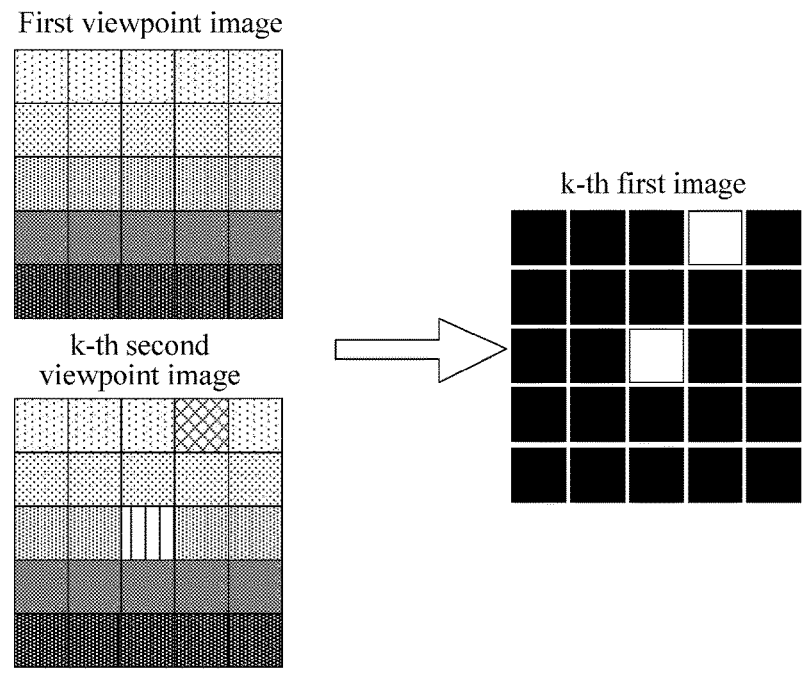
FIG. 3 is a schematic diagram of obtaining a first image according to an exemplary embodiment.

In an exemplary embodiment, FIG. 3 is a schematic diagram of obtaining a first image according to an exemplary embodiment. As shown in FIG. 3, the encoding module is further configured to obtain information of a pixel in an i-th row and a j-th column of the k-th first image according to information of a pixel in an i-th row and a j-th column of the first viewpoint image and information of a pixel in an i-th row and a j-th column of the k-th second viewpoint image; and obtain the k-th first image according to information of all pixels of the k-th first image, j=1, 2, . . . , N.

In an exemplary embodiment, information of a pixel may include color component information, or color voltage information, or other data information, which is not limited in the present disclosure.

In an exemplary embodiment, the color component information may include a first color component value, a second color component value, and a third color component value. The color voltage information may include a first color voltage value, a second color voltage value, and a third color voltage value. A first color, a second color, and a third color are one of red, green, and blue respectively and are different colors.

In an exemplary embodiment, when the information of the pixel includes the color component information, the encoding module may be further configured to obtain a grayscale value of the pixel in the i-th row and the j-th column of the first viewpoint image according to color component information of the pixel in the i-th row and the j-th column of the first viewpoint image; and obtain a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel.

In an exemplary embodiment, when the information of the pixel includes the color component information, the encoding module may be further configured to calculate a difference between a first color component value of the pixel in the i-th row and the j-th column of the first viewpoint image and a first color component value of the pixel in the i-th row and the j-th column of the k-th second viewpoint image to obtain a first color component difference; calculate a difference between a second color component value of the pixel in the i-th row and the j-th column of the first viewpoint image and a second color component value of the pixel in the i-th row and the j-th column of the k-th second viewpoint image to obtain a second color component difference; calculate a difference between a third color component value of the pixel in the i-th row and the j-th column of the first viewpoint image and a third color component value of the pixel in the i-th row and the j-th column of the k-th second viewpoint image to obtain a third color component difference; and obtain a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel.

In an exemplary embodiment, a corresponding relationship between colors of pixels and color component information of the pixels is stored in the encoding module. The encoding module obtains the color component information of the pixel in the i-th row and the j-th column of the first viewpoint image according to a color of the pixel in the i-th row and the j-th column of the first viewpoint image and the corresponding relationship between the colors of the pixels and the color component information of the pixels, and obtains color component information of a pixel in an i-th row and a j-th column of a second viewpoint image according to a color of the pixel in the i-th row and the j-th column of the second viewpoint image and the corresponding relationship between the colors of the pixels and the color component information of the pixels.

In an exemplary embodiment, when a pixel in an i-th row and a j-th column of a first image is a white pixel, it means that the color of the pixel in the i-th row and the j-th column of the first viewpoint image is quite different from the color of the pixel in the i-th row and the j-th column of the second viewpoint image. When the pixel in the i-th rows and the j-th column of the first image is a black pixel, it means that the color of the pixel in the i-th row and the j-th column of the first viewpoint image is not much different from the color of the pixel in the i-th row and the j-th column of the second viewpoint image.

In an exemplary embodiment, when the color of the pixel in the i-th rows and the j-th columns of the k-th second viewpoint image is different, the threshold difference during obtaining the k-th first image is different, that is to say, determination of color difference satisfies Weber's law. A threshold difference used when determining that a pixel in the k-th first image is a white pixel or a black pixel when the color of the pixel in the i-th row and the j-th column of the k-th second viewpoint image is the first color is different from a threshold difference used when determining that the pixel in the k-th first image is the white pixel or the black pixel when the color of the pixel in the i-th row and the j-th column of the k-th second viewpoint image is the second color, wherein the first color and the second color are different colors.

FIG. 3 is illustrated by taking a color of a pixel in a first row and a fourth column of the first viewpoint image being quite different from a color of a pixel in a first row and a fourth column of the k-th second viewpoint image and a color of a pixel in a third row and a third column of the first viewpoint image being quite different from a color of a pixel in a third row and a third column of the k-th second viewpoint image as an example. At this time, a pixel in a first row and a fourth column of the k-th first image and a pixel in a third row and a third column of the k-th first image are white pixels.

Figure 4:
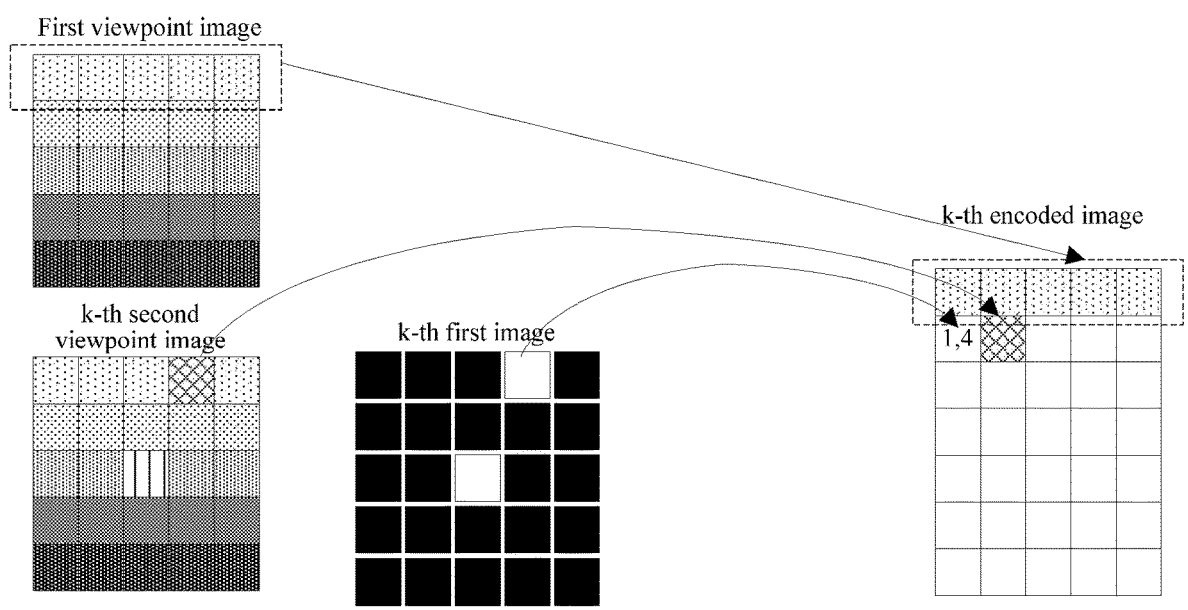
FIG. 4 is a schematic diagram of obtaining an encoded image according to an exemplary embodiment.

FIG. 4 is a schematic diagram of obtaining an encoded image according to an exemplary embodiment. FIG. 4 is illustrated by taking M=5 and N=5 as an example. As shown in FIG. 4, in an exemplary embodiment, the encoding module is configured to take a first row of pixels of the first viewpoint image as a first row of pixels of each encoded image; scan a first row of pixels of the k-th first image; when there is no white pixel in the first row of the pixels of the k-th first image, select a next row of pixels of the first viewpoint image as a next row of pixels of the k-th encoded image; and when there is a white pixel in the first row of pixels of the k-th first image, obtain position information of the white pixel and information of a pixel corresponding to the white pixel in the k-th second viewpoint image, store the position information of the white pixel and the information of the pixel corresponding to the white pixel in the k-th second viewpoint image into two adjacent pixels in the next row of pixels of the k-th encoded image, and scan sequentially an r-th row of pixels of the first image corresponding to the k-th second viewpoint image until scanning of a last row of pixels of the first image corresponding to the k-th second viewpoint image is completed, to obtain the k-th encoded image, 2≤r≤M.

As shown in FIG. 4, there is a white pixel in the first row of pixels of the k-th first image. Position information of the white pixel and information of a pixel corresponding to the white pixel in the k-th second viewpoint image are stored in first and second pixels in a second row of pixels of an encoded image corresponding to a second viewpoint image according to the position information of the white pixel, that is, a first row and a fourth column, and color component information of a pixel corresponding to the white pixel in the second viewpoint image. When there are a plurality of white pixels in the first row of pixels, position information of an i-th white pixel and information of a pixel corresponding to the white pixel in the k-th second viewpoint image are stored in (2i−1)-th and (2i)-th pixels in a second row of pixels of the k-th encoded image, that is, position information of a first white pixel and information of a pixel corresponding to the white pixel in the k-th second viewpoint image are stored in first and second pixels in the second row of pixels of the k-th encoded image, position information of a second white pixel and information of a pixel corresponding to the white pixel in the k-th second viewpoint image are stored in third and fourth pixels in the second row of pixels of the k-th encoded image, and so on. At this time, other pixels in the second row of pixels of the k-th encoded image may be white pixels.

The encoding method according to the present disclosure may maintain image quality effectively.

In an exemplary embodiment, position information may include a quantity of rows and columns where a white pixel is located in a first image.

In an exemplary embodiment, a pixel corresponding to a white pixel in a second viewpoint image is a pixel, which is located in a row and a column where the white pixel is located in a first image, in the second viewpoint image.

Figure 5:
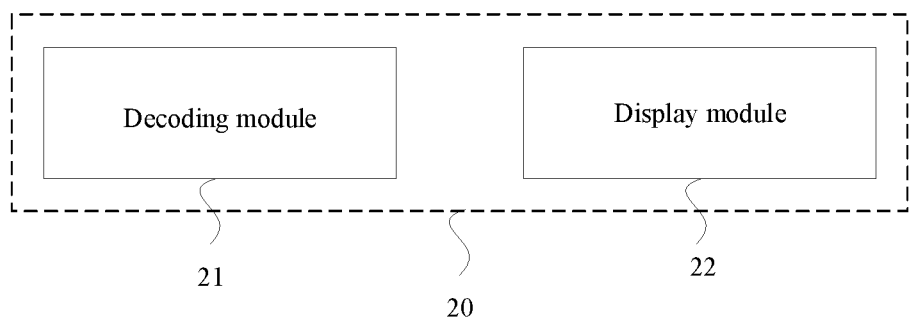
FIG. 5 is a schematic diagram of a structure of a display apparatus according to an exemplary embodiment.

FIG. 5 is a schematic diagram of a structure of a display apparatus according to an exemplary embodiment. As shown in FIG. 5, in an exemplary embodiment, the display apparatus 20 may include a decoding module 21 and a display module 22. The decoding module 21 is configured to receive a plurality of encoded images and obtain M pieces of display information according to the plurality of encoded images. The display module 22 is configured to receive the M pieces of display information and perform stereoscopic display according to the M pieces of display information.

In an exemplary embodiment, the decoding module is further configured to obtain K−1 second viewpoint images corresponding to K−1 encoded images according to the K−1 encoded images, wherein a k-th second viewpoint image is obtained according to a k-th encoded image; and obtain the M pieces of display information according to a first viewpoint image and the K−1 second viewpoint images.

Figure 6:
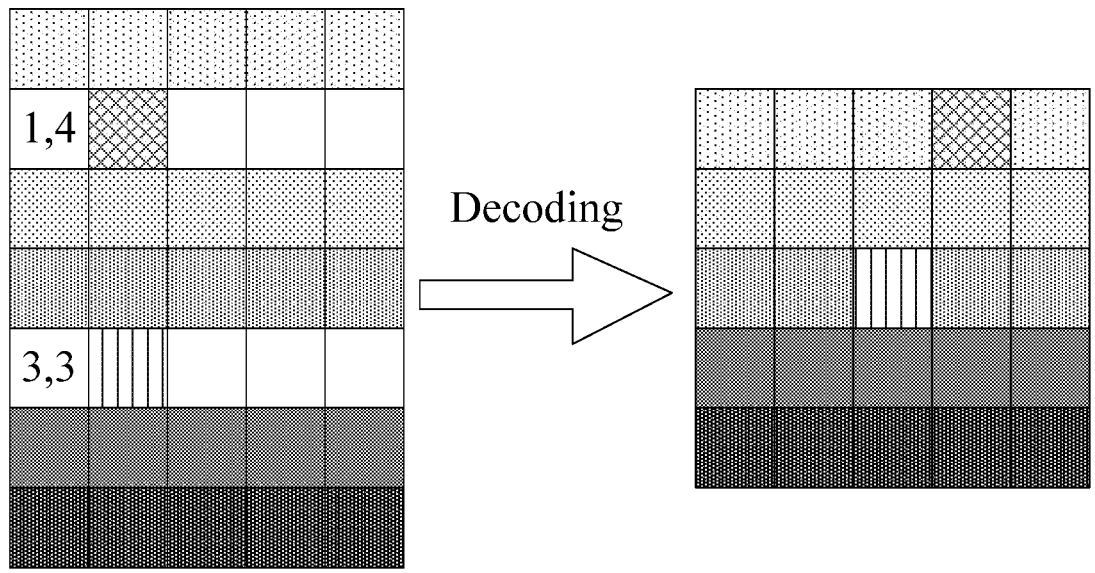
FIG. 6 is a schematic diagram of decoding an encoded image according to an exemplary embodiment.

FIG. 6 is a schematic diagram of decoding an encoded image according to an exemplary embodiment. As shown in FIG. 6, in an exemplary embodiment, the decoding module is configured to take a first row of pixels of a k-th encoded image as a first row of pixels of the k-th second viewpoint image, scan a next row of pixels of the k-th encoded image, if position information is included in a second row of pixels, acquire information stored in a pixel adjacent to a pixel including the position information, update information of a pixel located at the position information in the k-th second viewpoint image to the information stored in the pixel adjacent to the pixel including the position information; and if no position information is included in the next row of pixels, take the next row of pixels of the k-th encoded image as a next row of pixels of the k-th second viewpoint image, and scan sequentially an r-th row of pixels of the k-th encoded image until scanning of a last row of pixels of the k-th encoded image is completed, to obtain the k-th second viewpoint image.

In an exemplary embodiment, the decoding module is configured to obtain i-th rows of pixels of K viewpoint images according to the first viewpoint image and the K−1 second viewpoint images; and obtain the M pieces of display information according to first row of pixels to M-th rows of pixels of the K viewpoint images.

In an exemplary embodiment, the display module is configured to display the i-th rows of the K viewpoint images according to an i-th piece of display information.

In the present disclosure, the i-th rows of pixels of the K viewpoint images are displayed line by line through the display module, so that a storage space occupied during decoding may be small, which is conductive to rapid display.

Encoding and decoding methods according to the present disclosure may not only achieve lossless viewpoint images, but also be simple and easy to implement and be intelligent.

Figure 7:
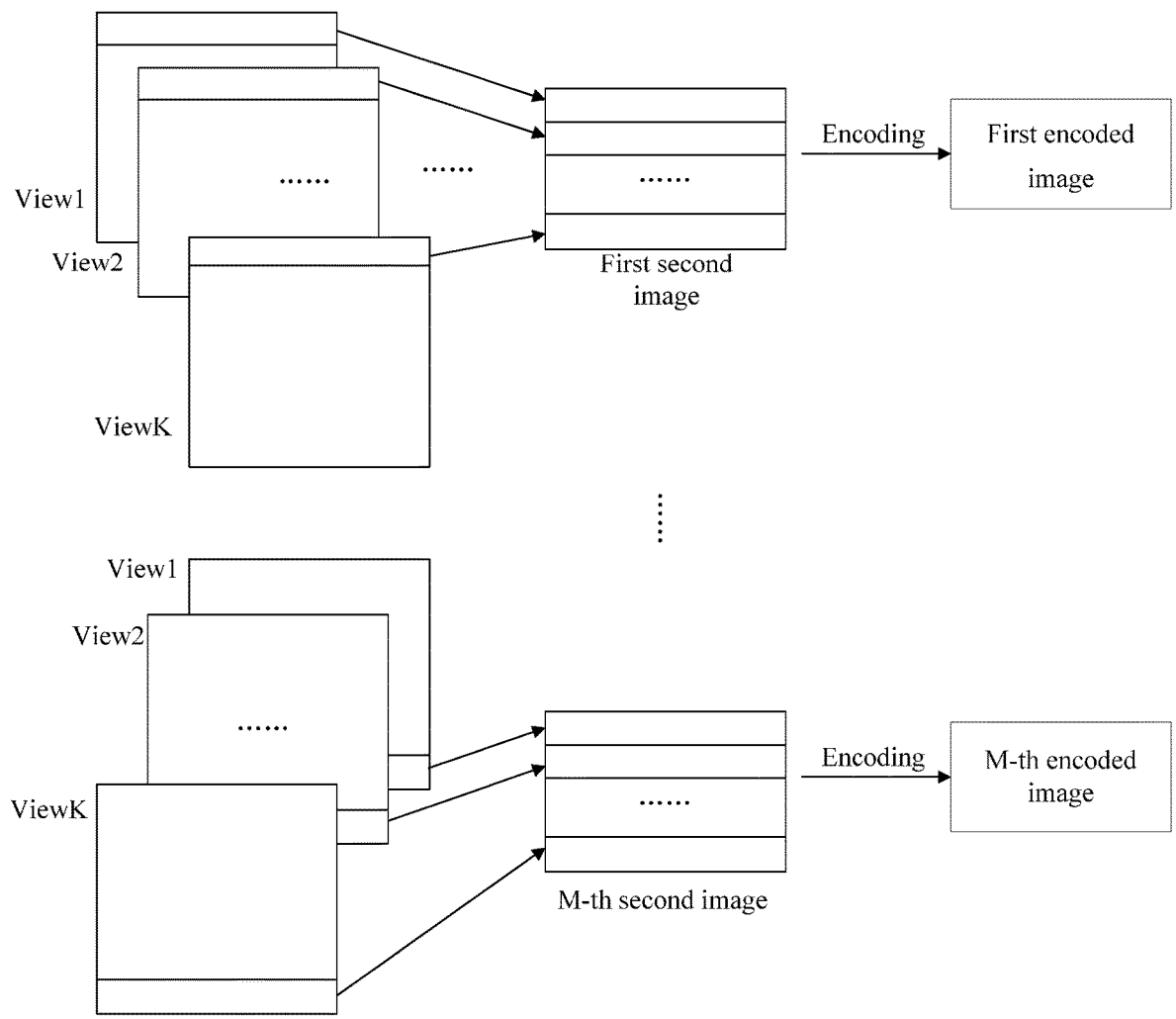
FIG. 7 is a schematic diagram of encoding by a processing apparatus according to an exemplary embodiment.

FIG. 7 is a schematic diagram of encoding by a processing apparatus according to an exemplary embodiment. As shown in FIG. 7, in an exemplary embodiment, the encoding module is configured to extract sequentially an i-th row of pixels of each viewpoint image to form M second images; and encode the M second images to generate M encoded images. View in FIG. 7 is an i-th viewpoint image.

In an exemplary embodiment, each second image includes K rows and N columns of pixels, and an n-th row of pixels of an i-th second image is an i-th row of pixels of an n-th viewpoint image, n=1, 2, . . . , K.

In an exemplary embodiment, the M second images may be encoded by using Huffman coding, run-length coding, or orthogonal transform coding. In the present disclosure, Huffman coding, run-length coding, or orthogonal transform coding is adopted for coding, so that compression of encoded images and second images is relatively large, and its technology is relatively mature.

Figure 8:
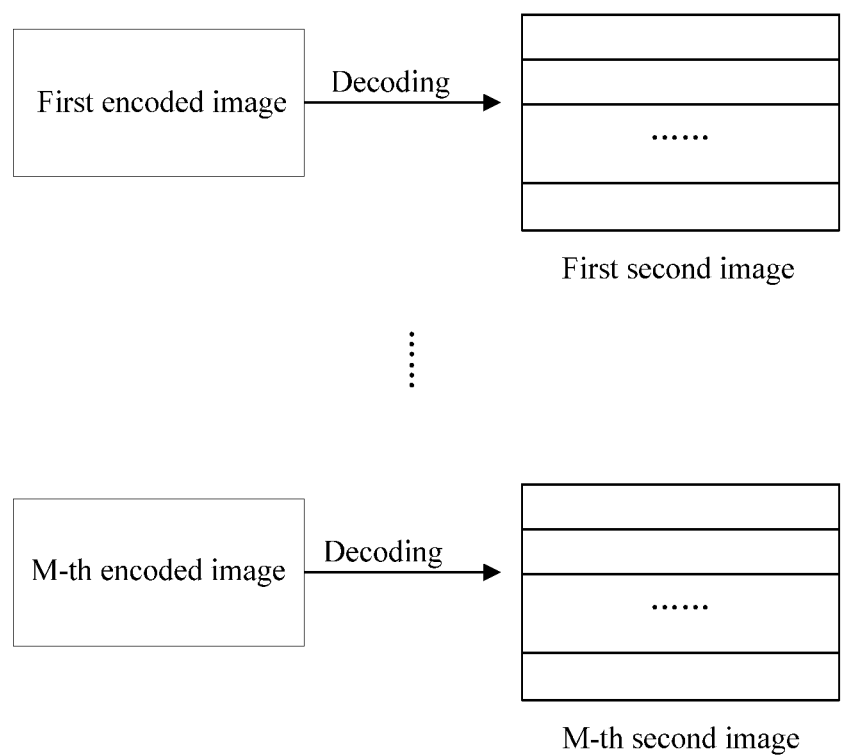
FIG. 8 is a schematic diagram of encoding by a display apparatus according to an exemplary embodiment.

FIG. 8 is a schematic diagram of encoding by a display apparatus according to an exemplary embodiment. As shown in FIG. 8, in an exemplary embodiment, the display apparatus is configured to decode sequentially M encoded images to obtain M second images, an i-th second image including an i-th piece of display information; and display i-th rows of pixels of K viewpoint images according to the i-th second image.

In the present disclosure, the i-th rows of pixels of the K viewpoint images are displayed line by line, and one row of a viewpoint image is processed, so that a storage space may be saved.

An embodiment of the present disclosure further provides an image processing method, which is applied in a multi-viewpoint image processing system. The image processing method according to the embodiment of the present disclosure may include following acts.

In act S1, K viewpoint images are acquired.

In an exemplary embodiment, a viewpoint image includes M rows and N columns of pixels, K is a positive integer greater than or equal to 2, and M and N are positive integers greater than or equal to 1.

In act S2, the K viewpoint images are received, the K viewpoint images are encoded, a plurality of encoded images are generated, and the plurality of encoded images are sent to a display apparatus.

In act S3, the plurality of encoded images are received and M pieces of display information are obtained according to the plurality of encoded images.

In an exemplary embodiment, an i-th piece of display information includes i-th rows of pixels of the K viewpoint images, i=1, 2, . . . , M.

In act S4, stereoscopic display is performed according to the M pieces of display information.

The multi-viewpoint image processing system is the multi-viewpoint image processing system according to any one of the foregoing embodiments, and their implementation principles and implementation effects are similar and will not be repeated herein.

In an exemplary embodiment, acquiring the K viewpoint images includes: acquiring an image to be displayed, and acquiring the K viewpoint images according to the image to be displayed, or acquiring the K viewpoint images obtained by a multi-viewpoint collection apparatus.

In an exemplary embodiment, encoding the K viewpoint images and generating the plurality of encoded images includes: selecting an m-th viewpoint image from the K viewpoint images as a first viewpoint image, and taking all viewpoint images except the m-th viewpoint image as second viewpoint images, a quantity of the second viewpoint images being K−1, 1≤m≤K; obtaining K−1 first images according to the first viewpoint image and the K−1 second viewpoint images, wherein a k-th first image is obtained according to the first viewpoint image and a k-th second viewpoint image, k=1, 2, . . . , K−1; obtaining K−1 encoded images according to the first viewpoint image, the K−1 second viewpoint images, and the K−1 first images, wherein the k-th encoded image are obtained according to the first viewpoint image, the k-th second viewpoint image, and the k-th first image; and sending the K−1 encoded images and the first viewpoint image, the first images and the encoded images each including M rows and N columns of pixels.

In an exemplary embodiment, obtaining the K−1 first images according to the first viewpoint image and the K−1 second viewpoint images includes: obtaining information of a pixel in an i-th row and a j-th column of the k-th first image according to information of a pixel in an i-th row and a j-th column of the first viewpoint image and information of a pixel in an i-th row and a j-th column of the k-th second viewpoint image; and obtaining the k-th first image according to information of all pixels of the k-th first image, j=1, 2, . . . , N.

In an exemplary embodiment, information of a pixel may include color component information, or color voltage information, or other data information, which is not limited in the present disclosure.

In an exemplary embodiment, the color component information may include a first color component value, a second color component value, and a third color component value. The color voltage information may include a first color voltage value, a second color voltage value, and a third color voltage value. The first color, the second color, and the third color are one of red, green, and blue respectively and are different colors.

In an exemplary embodiment, when the information of the pixel includes the color component information, obtaining the information of the pixel in the i-th row and the j-th column of the k-th first image according to the information of the pixel in the i-th row and the j-th column of the first viewpoint image and the information of the pixel in the i-th row and the j-th column of the k-th second viewpoint image includes: obtaining a grayscale value of the pixel in the i-th row and the j-th column of the first viewpoint image according to color component information of the pixel in the i-th row and the j-th column of the first viewpoint image; and obtaining a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel.

In an exemplary embodiment, when the information of the pixel includes the color component information, obtaining the information of the pixel in the i-th row and the j-th column of the k-th first image according to the information of the pixel in the i-th row and the j-th column of the first viewpoint image and the information of the pixel in the i-th row and the j-th column of the k-th second viewpoint image includes: calculating a difference between a first color component value of the pixel in the i-th row and the j-th column of the first viewpoint image and a first color component value of the pixel in the i-th row and the j-th column of the k-th second viewpoint image to obtain a first color component difference; calculating a difference between a second color component value of the pixel in the i-th row and the j-th column of the first viewpoint image and a second color component value of the pixel in the i-th row and the j-th column of the k-th second viewpoint image to obtain a second color component difference; calculating a difference between a third color component value of the pixel in the i-th row and the j-th column of the first viewpoint image and a third color component value of the pixel in the i-th row and the j-th column of the k-th second viewpoint image to obtain a third color component difference; and obtaining a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel.

In an exemplary embodiment, when a color of the pixel in the i-th row and the j-th column of the k-th second viewpoint image is different, a threshold difference during obtaining the k-th first image is different.

In an exemplary embodiment, obtaining the K-1 encoded images according to the first viewpoint image, the K-1 second viewpoint images, and the K-1 first images includes: taking a first row of pixels of the first viewpoint image as a first row of pixels of each encoded image; scanning a first row of pixels of the k-th first image; when there is no white pixel in the first row of pixels of the k-th first image, selecting a next row of pixels of the first viewpoint image as a next row of pixels of a k-th encoded image; and when there is a white pixel in the first row of pixels of the k-th first image, obtaining position information of the white pixel and information of a pixel corresponding to the white pixel in the k-th second viewpoint image, storing the position information of the white pixel and the information of the pixel corresponding to the white pixel in the second viewpoint image into two adjacent pixels in the next row of pixels of the k-th encoded image, and scanning sequentially an r-th row of pixels of the k-th first image until scanning of a last row of pixels of the k-th first image is completed, to obtain the k-th encoded image, $2 \leq r \leq M$.

In an exemplary embodiment, position information may include a row and a column where a white pixel is located in a first image.

In an exemplary embodiment, a pixel corresponding to a white pixel in a second viewpoint image is a pixel in the second viewpoint image, which is located in a row and a column where the white pixel is located in a first image.

In an exemplary embodiment, obtaining the M pieces of display information according to the plurality of encoded images includes: obtaining the K-1 second viewpoint images according to the K-1 encoded images; and obtaining the M pieces of display information according to the first viewpoint image and the K-1 second viewpoint images.

In an exemplary embodiment, the k-th second viewpoint image is obtained according to the k-th encoded image.

In an exemplary embodiment, obtaining the K-1 second viewpoint images according to the K-1 encoded images includes: taking a first row of pixels of the k-th encoded image as a first row of pixels of the k-th second viewpoint image, scanning a next row of pixels of the k-th encoded image, if position information is included in the next row of pixels, acquiring information stored in a pixel adjacent to a pixel including the position information, and updating information of a pixel located at the position information in the k-th second viewpoint image to the information stored in the pixel adjacent to the pixel including the position information; and if no position information is included in the next row of pixels, taking the next row of pixels of the k-th encoded image as the next row of pixels of the k-th second viewpoint image, and scanning sequentially the r-th row of pixels of the k-th encoded image until scanning of the last row of pixels of the k-th encoded image is completed, to obtain the k-th second viewpoint image.

In an exemplary embodiment, obtaining the M pieces of display information of the K viewpoint images according to the first viewpoint image and the K-1 second viewpoint images includes: obtaining sequentially i-th rows of pixels of the K viewpoint images; and obtaining the M pieces of display information according to first rows of pixels to M-th rows of pixels of the K viewpoint images.

In an exemplary embodiment, performing stereoscopic display according to the M pieces of display information includes: displaying the i-th rows of the K viewpoint images according to an i-th piece of display information.

In an exemplary embodiment, encoding the K viewpoint images and generating the plurality of encoded images includes: extracting sequentially an i-th row of pixels of each viewpoint image to form M second images; and encoding the M second images to generate M encoded images.

In an exemplary embodiment, each second image includes K rows and N columns of pixels, and an n-th row of pixels of an i-th second image is an i-th row of pixels of an n-th viewpoint image, n=1, 2, . . . , K.

In an exemplary embodiment, obtaining the M pieces of display information of the K viewpoint images according to the plurality of encoded images includes: decoding sequentially the M encoded images to obtain M second images, an i-th second image including an i-th piece of display information; and displaying the i-th rows of pixels of the K viewpoint images according to the i-th second image.

Those of ordinary skills in the art should understand that modifications or equivalent substitutions may be made to the technical solutions of the embodiments of the present disclosure without departing from the spirit and scope of the technical solutions of the present disclosure, and shall all fall within the scope of the claims of the present application.

It may be understood by those of ordinary skill in the art that all or some acts in the method disclosed above and function modules/units in the system and apparatuses may be implemented as software, firmware, hardware, and proper combinations thereof. In a hardware implementation, division of the function modules/units mentioned in the above description does not necessarily correspond to division of physical components. For example, a physical component may have multiple functions, or a function or act may be performed cooperatively by several physical components. Some or all components may be implemented as software executed by a processor such as a digital signal processor or a microprocessor, or implemented as hardware, or implemented as integrated circuits such as application specific integrated circuits. Such software may be distributed in a computer-readable medium, which may include a computer storage medium (or a non-transitory medium) and a communication medium (or a transitory medium). As known to those of ordinary skill in the art, the term "computer storage medium" includes volatile and non-volatile and removable and irremovable media implemented in any method or technology for storing information (such as computer-readable instructions, a data structure, a program module, or other data). The computer storage medium includes, but is not limited to, a Random Access Memory (RAM), a Read-Only Memory (ROM), an Electrically-Erasable Programmable Read-Only Memory (EEPROM), a flash memory or other memory technologies, a Compact Disc Read-Only Memory (CD-ROM), a Digital Versatile Disk (DVD) or other optical disk storage, a magnetic cassette, a magnetic tape, a magnetic disk storage or other magnetic storage apparatus, or any other medium that may be used for storing desired information and may be accessed by a computer. In addition, as known to those of ordinary skill in the art, the communication medium usually contains computer-readable instructions, a data structure, a program module, or other data in a modulated data signal, such as a carrier or other transmission mechanisms, and may include any information delivery medium.

The accompanying drawings of the present disclosure only involve structures involved in the embodiments of the present disclosure, and other structures may be described with reference to conventional designs.

Although the embodiments disclosed in the present disclosure are described as above, the described contents are only embodiments which are used in order to facilitate understanding of the present disclosure, and are not intended to limit the present disclosure. Any skilled person in the art to which the present disclosure pertains may make any modifications and alterations in forms and details of implementation without departing from the spirit and scope of the present disclosure. However, the patent protection scope of the present disclosure should be subject to the scope defined by the appended claims.

The invention claimed is:

1. A multi-viewpoint image processing system, comprising: a processing apparatus and a display apparatus, wherein the processing apparatus comprises an acquisition module and an encoding module, the acquisition module is configured to acquire K viewpoint images, wherein a viewpoint image comprises M rows and N columns of pixels, K is a positive integer greater than or equal to 2, and M and N are positive integers greater than or equal to 1;

the encoding module is configured to receive the K viewpoint images, encode the K viewpoint images to generate a plurality of encoded images, and send the plurality of encoded images to the display apparatus;

the display apparatus is configured to receive the plurality of encoded images and obtain M pieces of display information according to the plurality of encoded images, an i-th piece of display information comprising i-th rows of pixel points of the K viewpoint images, $i=1, 2, \ldots, M$; and perform stereoscopic display according to the M pieces of display information; and the processing apparatus is arranged in the display apparatus, or the processing apparatus and the display apparatus are arranged separately, the display apparatus comprises a decoding module and a display module, wherein the decoding module is configured to receive the plurality of encoded images and obtain the M pieces of display information according to the plurality of encoded images; and the display module is configured to receive the M pieces of display information and perform stereoscopic display according to the M pieces of display information, wherein the decoding module is configured to obtain the i-th rows of pixels of the K viewpoint images according to the first viewpoint image and the K−1 second viewpoint images; and obtain the M pieces of display information according to first rows of pixels to M-th rows of pixels of the K viewpoint images; and the display module is configured to display the i-th rows of the K viewpoint images according to the i-th piece of display information, wherein the encoding module is configured to select an m-th viewpoint image from the K viewpoint images as a first viewpoint image, and take all viewpoint images except the m-th viewpoint image as second viewpoint images, a quantity of the second viewpoint images being K−1, $1 \leq m \leq K$; obtain K−1 first images according to the first viewpoint image and the K−1 second viewpoint images, wherein a k-th first image is obtained according to the first viewpoint image and a k-th second viewpoint image, $k=1, 2, \ldots, K-1$; obtain K−1 encoded images according to the first viewpoint image, the K−1 second viewpoint images, and the K−1 first images, wherein a k-th encoded image is obtained according to the first viewpoint image, the k-th second viewpoint image, and the k-th first image; and send the K−1 encoded images and the first viewpoint image, the first images and the encoded images each comprising M rows and N columns of pixels, or the encoding module is configured to extract sequentially an i-th row of pixels of each of the viewpoint images to form M second images, each of the second images comprising K rows and N columns of pixels, and an n-th row of pixels of an i-th second image being an i-th row of pixels of an n-th viewpoint image, $n=1, 2, \ldots, K$; and encode the M second images to generate M encoded images.

2. The system according to claim 1, wherein the acquisition module is configured to acquire an image to be displayed, and acquire the K viewpoint images according to the image to be displayed.

3. The system according to claim 1, further comprising a multi-viewpoint collection apparatus, the multi-viewpoint collection apparatus comprises a plurality of Charge Coupled Device (CCD) cameras, wherein each of the CCD cameras in the multi-viewpoint collection apparatus performs dynamic scene collection to obtain the K viewpoint images; and the acquisition module is configured to receive the K viewpoint images obtained by the multi-viewpoint collection apparatus.

4. The system according to claim 1, wherein the encoding module is further configured to obtain information of a pixel in an i-th row and a j-th column of the k-th first image according to information of a pixel in an i-th row and a j-th column of the first viewpoint image and information of a pixel in an i-th row and a j-th column of the k-th second viewpoint image; and obtain the k-th first image according to information of all pixels of the k-th first image, $j=1, 2, \ldots, N$.

5. The system according to claim 4, wherein the information of the pixel comprises color component information, the color component information comprises a first color component value, a second color component value, and a third color component value, the first color, the second color, and the third color are one of red, green, and blue respectively and are different colors;

the encoding module is further configured to obtain a grayscale value of the pixel in the i-th row and the j-th column of the first viewpoint image according to color component information of the pixel in the i-th row and the j-th column of the first viewpoint image; and obtain a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel;

or the encoding module is further configured to calculate a difference between a first color component value of the pixel in the i-th row and the j-th column of the first viewpoint image and a first color component value of the pixel in the i-th row and the j-th column of the k-th second viewpoint image to obtain a first color component difference; calculate a difference between a second color component value of the pixel in the i-th row and the j-th column of the first viewpoint image and a second color component value of the pixel in the i-th row and the j-th column of the k-th second viewpoint image to obtain a second color component difference; calculate a difference between a third color component value of the pixel in the i-th row and the j-th column of the first viewpoint image and a third color component value of the pixel in the i-th row and the j-th column of the k-th second viewpoint image to obtain a third color component difference; and obtain a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel; and when a color of the pixel in the i-th row and the j-th column of the k-th second viewpoint image is different, a threshold difference during obtaining the k-th first image is different.

6. The system according to claim 1, wherein the encoding module is further configured to take a first row of pixels of the first viewpoint image as a first row of pixels of each of the encoded images; scan a first row of pixels of the k-th first image; when there is no white pixel in the first row of pixels of the k-th first image, select a next row of pixels of the first viewpoint image as a next row of pixels of the k-th encoded image; and when there is a white pixel in the first row of pixels of the k-th first image, obtain position information of the white pixel and information of a pixel corresponding to the white pixel in the k-th second viewpoint image, store the position information of the white pixel and the information of the pixel corresponding to the white pixel in the k-th second viewpoint image into two adjacent pixels in the next row of pixels of the k-th encoded image, and scan sequentially an r-th row of pixels of the k-th first image until scanning of a last row of pixels of the k-th first image is completed, to obtain the k-th encoded image, $2 \leq r \leq M$, wherein position information comprises a row and a column where a white pixel is located in a first image, and a pixel corresponding to the white pixel in a second viewpoint image is a pixel in the second viewpoint image, which is located in the row and the column where the white pixel is located in the first image.

7. The system according to claim 1, wherein the decoding module is further configured to obtain K−1 second viewpoint images according to K−1 encoded images, wherein a k-th second viewpoint image is obtained according to a k-th encoded image; and obtain the M pieces of display information according to a first viewpoint image and the K−1 second viewpoint images.

8. The system according to claim 7, wherein the decoding module is further configured to take a first row of pixels of the k-th encoded image as a first row of pixels of the k-th second viewpoint image, scan a next row of pixels of the k-th encoded image, if position information is comprised in the next row of pixels, acquire information of a pixel stored in a pixel adjacent to a pixel comprising the position information, and update information of a pixel located at the position information in the k-th second viewpoint image to the information of the pixel stored in the pixel adjacent to the pixel comprising the position information; and if no position information is comprised in the next row of pixels, take the next row of pixels of the k-th encoded image as a next row of pixels of the k-th second viewpoint image, and scan sequentially an r-th row of pixels of the k-th encoded image until scanning of a last row of pixels of the k-th encoded image is completed, to obtain the k-th second viewpoint image.

9. The system according to claim 1, wherein the display apparatus is configured to decode sequentially the M encoded images to obtain the M second images, the i-th second image comprising the i-th piece of display information; and display the i-th rows of the K viewpoint images according to the i-th second image.

10. An image processing method, comprising:
acquiring K viewpoint images, wherein an viewpoint image comprises M rows and N columns of pixels, K is a positive integer greater than or equal to 2, and M and N are positive integers greater than or equal to 1;
receiving the K viewpoint images, encode the K viewpoint images to generate a plurality of encoded images, and send the plurality of encoded images to a display apparatus;
receiving the plurality of encoded images and obtain M pieces of display information according to the plurality of encoded images, an i-th piece of display information comprising i-th rows of pixels of the K viewpoint images, i=1, 2, . . . , M; and
performing stereoscopic display according to the M pieces of display information,
wherein the obtaining the M pieces of display information according to the plurality of encoded images comprises: obtaining K−1 second viewpoint images according to K−1 encoded images, wherein a k-th second viewpoint image is obtained according to a k-th encoded image; and obtaining the M pieces of display information according to a first viewpoint image and the K−1 second viewpoint images;
the obtaining the K−1 second viewpoint images according to the K−1 encoded images comprises: taking a first row of pixels of the k-th encoded image as a first row of pixels of the k-th second viewpoint image, scanning a next row of pixels of the k-th encoded image, if position information is comprised in the next row of pixels, acquiring information of a pixel stored in a pixel adjacent to a pixel comprising the position information, and updating information of a pixel located at the position information in the k-th second viewpoint image to the information of the pixel stored in the pixel adjacent to the pixel comprising the position information; and if no position information is comprised in the next row of pixels, taking the next row of pixels of the k-th encoded image as a next row of pixels of the k-th second viewpoint image, and scanning sequentially an r-th row of pixels of the k-th encoded image until scanning of a last row of pixels of the k-th encoded image is completed, to obtain the k-th second viewpoint image;

the obtaining the M pieces of display information of the K viewpoint images according to the first viewpoint image and the K−1 second viewpoint images comprises: obtaining sequentially the i-th rows of pixels of the K viewpoint images; and obtaining the M pieces of display information according to first rows of pixels to M-th rows of pixels of the K viewpoint images;

the performing stereoscopic display according to the M pieces of display information comprises displaying the i-th rows of the K viewpoint images according to the i-th piece of display information, wherein the encoding the K viewpoint images to generate the plurality of encoded images comprises: selecting an m-th viewpoint image from the K viewpoint images as a first viewpoint image, and taking all viewpoint images except the m-th viewpoint image as second viewpoint images, a quantity of the second viewpoint images being K−1, 1≤m≤K; obtaining K−1 first images according to the first viewpoint image and the K−1 second viewpoint images, wherein a k-th first image is obtained according to the first viewpoint image and a k-th second viewpoint image, k=1, 2, . . . , K−1; obtaining K−1 encoded images according to the first viewpoint image, the K−1 second viewpoint images, and the K−1 first images, wherein a k-th encoded image is obtained according to the first viewpoint image, the k-th second viewpoint image, and the k-th first image; and sending the K−1 encoded images and the first viewpoint image, the first images and the encoded images each comprising M rows and N columns of pixels, or wherein the encoding the K viewpoint images to generate the plurality of encoded images comprises: extracting sequentially an i-th row of pixels of each of the K viewpoint images to form M second images, each of the second images comprising K rows and N columns of pixels, and an n-th row of pixels of an i-th second image being an i-th row of pixels of an n-th viewpoint image, n=1, 2, . . . , K; and encoding the M second images to generate M encoded images.

11. The method according to claim 10, wherein the acquiring the K viewpoint images comprises: acquiring an image to be displayed, and acquiring the K viewpoint images according to the image to be displayed, or acquiring the K viewpoint images obtained by a multi-viewpoint collection apparatus.

12. The method according to claim 10, wherein the obtaining the K−1 first images according to the first viewpoint image and the K−1 second viewpoint images comprises: obtaining information of a pixel in an i-th row and a j-th column of the k-th first image according to information of a pixel in an i-th row and a j-th column of the first viewpoint image and information of a pixel in an i-th row and a j-th column of the k-th second viewpoint image; and obtaining the k-th first image according to information of all pixels of the k-th first image, j=1, 2, . . . , N;

the information of the pixel comprises color component information, the color component information comprises a first color component value, a second color component value, and a third color component value, and the first color, the second color, and the third color are one of red, green, and blue respectively and are different colors;

the obtaining the information of the pixel in the i-th row and the j-th column of the k-th first image according to the information of the pixel in the i-th row and the j-th column of the first viewpoint image and the information of the pixel in the i-th row and the j-th column of the k-th second viewpoint image comprises:

obtaining a grayscale value of the pixel in the i-th row and the j-th column of the first viewpoint image according to color component information of the pixel in the i-th row and the j-th column of the first viewpoint image; and obtaining a grayscale value of the pixel in the i-th row and the j-th column of the k-th second viewpoint image according to color component information of the pixel in the i-th row and the j-th column of the k-th second viewpoint image, wherein when a difference between the grayscale value of the pixel in the i-th row and the j-th column of the first viewpoint image and the grayscale value of the pixel in the i-th row and the j-th column of the k-th second viewpoint image is less than a threshold difference, the pixel in the i-th row and the j-th column of the k-th first image is a black pixel, and when the difference between the grayscale value of the pixel in the i-th row and the j-th column of the first viewpoint image and the grayscale value of the pixel in the i-th row and the j-th column of the k-th second viewpoint image is greater than the threshold difference, the pixel in the i-th row and the j-th column of the k-th first image is a white pixel;

or calculating a difference between a first color component value of the pixel in the i-th row and the j-th column of the first viewpoint image and a first color component value of the pixel in the i-th row and the j-th column of the k-th second viewpoint image to obtain a first color component difference; calculating a difference between a second color component value of the pixel in the i-th row and the j-th column of the first viewpoint image and a second color component value of the pixel in the i-th row and the j-th column of the k-th second viewpoint image to obtain a second color component difference; calculating a difference between a third color component value of the pixel in the i-th row and the j-th column of the first viewpoint image and a third color component value of the pixel in the i-th row and the j-th column of the k-th second viewpoint image to obtain a third color component difference; and obtaining a grayscale difference according to the first color component difference, the second color component difference, and the third color component difference, wherein when the grayscale difference is less than a threshold difference, the pixel in the i-th row and the j-th column of the k-th first image is a black pixel, and when the grayscale difference is greater than the threshold difference, the pixel in the i-th row and the j-th column of the k-th first image is a white pixel;

when a color of the pixel in the i-th row and the j-th column of the k-th second viewpoint image is different, a threshold difference during obtaining the k-th first image is different; and the obtaining the K−1 encoded images according to the first viewpoint image, the K−1 second viewpoint images, and the K−1 first images comprises: taking a first row of pixels of the first viewpoint image as a first row of pixels of each of the encoded images; scanning a first row of pixels of the k-th first image; when there is no white pixel in the first row of pixels of the k-th first image, selecting a next row of pixels of the first viewpoint image as a next row of pixels of the k-th encoded image; and when there is a white pixel in the first row of pixels of the k-th first image, obtaining position information of the white pixel and information of a pixel corresponding to the white pixel in the k-th second viewpoint image, storing the position information of the white pixel and the information of the pixel corresponding to the white pixel in the k-th second viewpoint image into two adjacent pixels in the next row of pixels of the k-th encoded image, and scanning sequentially an r-th row of pixels of the k-th first image until scanning of a last row of pixels of the k-th first image is completed, to obtain the k-th encoded image, 2≤r≤M, wherein position information comprises a row and a column where a white pixel is located in a first image, and a pixel corresponding to the white pixel in a second viewpoint image is a pixel in the second viewpoint image, which is located in the row and the column where the white pixel is located in the first image.

13. The method according to claim 10, wherein the obtaining the M pieces of display information of the K viewpoint images according to the plurality of encoded images comprises: decoding sequentially M encoded images to obtain M second images, an i-th second image comprising the i-th piece of display information; and displaying the i-th rows of the K viewpoint images according to the i-th second image.

\* \* \* \* \*